United States Patent
Berry et al.

(10) Patent No.: US 8,266,912 B2
(45) Date of Patent: Sep. 18, 2012

(54) REUSABLE WELD JOINT FOR SYNGAS FUEL NOZZLES

(75) Inventors: Jonathan Dwight Berry, Simpsonville, SC (US); James T. Brown, Piedmont, SC (US)

(73) Assignee: General Electric Company, Schenectady, NY (US)

( * ) Notice: Subject to any disclaimer, the term of this patent is extended or adjusted under 35 U.S.C. 154(b) by 904 days.

(21) Appl. No.: 12/211,791

(22) Filed: Sep. 16, 2008

(65) Prior Publication Data
US 2010/0066035 A1    Mar. 18, 2010

(51) Int. Cl.
F02C 1/00 (2006.01)
F02C 7/20 (2006.01)
F02G 3/00 (2006.01)
F16J 15/02 (2006.01)

(52) U.S. Cl. .............. 60/740; 60/796; 60/800; 60/752; 277/647

(58) Field of Classification Search .......... 60/740, 60/796, 800, 752; 277/647
See application file for complete search history.

(56) References Cited

U.S. PATENT DOCUMENTS

| | | | |
|---|---|---|---|
| 3,709,529 A | 1/1973 | Mains | |
| 3,751,792 A | 8/1973 | Frakes | |
| 3,861,883 A | 1/1975 | Uto et al. | |
| 3,916,518 A | 11/1975 | Jones et al. | |
| 4,134,606 A | 1/1979 | Menti, Jr. | |
| 4,322,945 A * | 4/1982 | Peterson et al. | 60/800 |
| 4,365,470 A * | 12/1982 | Matthews et al. | 60/800 |
| 4,521,668 A | 6/1985 | Osial et al. | |
| 4,534,205 A | 8/1985 | van Caneghem | |
| 4,700,683 A | 10/1987 | Filippi et al. | |
| 5,449,107 A | 9/1995 | Umeno et al. | |
| 5,519,184 A | 5/1996 | Umlas | |
| 5,530,219 A | 6/1996 | Offer et al. | |
| 5,670,072 A | 9/1997 | Offer et al. | |
| 5,688,419 A | 11/1997 | Offer | |
| 5,916,142 A * | 6/1999 | Snyder et al. | 60/748 |
| 6,371,383 B1 | 4/2002 | Bulgatz | |
| 6,386,641 B2 | 5/2002 | Mondy | |
| 6,672,073 B2 * | 1/2004 | Wiebe | 60/796 |
| 6,913,056 B2 | 7/2005 | Landherr et al. | |
| 7,226,649 B2 | 6/2007 | Shang et al. | |
| 7,275,543 B2 | 10/2007 | Yang et al. | |
| 2001/0022465 A1 | 9/2001 | Mondy | |

FOREIGN PATENT DOCUMENTS

| | | |
|---|---|---|
| EP | 0767718 | 11/1995 |
| EP | 1184564 | 6/2002 |
| JP | 54058650 | 5/1979 |
| JP | 55010332 | 1/1980 |
| JP | 55010338 | 1/1980 |
| JP | 55014120 | 1/1980 |
| JP | 61117192 | 6/1986 |
| JP | 2005097924 | 4/2005 |
| JP | 08174284 | 9/2008 |
| WO | WO9529036 | 11/1995 |
| WO | WO9529487 | 11/1995 |
| WO | WO0064624 | 11/2000 |

* cited by examiner

Primary Examiner — William H Rodriguez
Assistant Examiner — Carlos A Rivera
(74) Attorney, Agent, or Firm — Fletcher Yoder, P.C.

(57) ABSTRACT

A system, one embodiment, includes an annular seal configured to seal a turbine fuel nozzle to a turbine combustor, wherein the annular seal includes a first annular seal portion having an inner annular surface, a first base portion, and a first peripheral portion opposite from the first base portion. The embodiment also includes the first annular seal portion configured to couple to a second annular seal portion having an outer annular surface, a second base portion, and a second peripheral portion opposite from the second base portion. Further, the embodiment includes the first and second peripheral portions sealable by a weld.

23 Claims, 6 Drawing Sheets

US 8,266,912 B2

REUSABLE WELD JOINT FOR SYNGAS FUEL NOZZLES

BACKGROUND OF THE INVENTION

The present disclosure relates generally to a system and arrangement for a fuel nozzle of a gas turbine engine and, more specifically, to a system for attaching a fuel nozzle to an end cover of the turbine engine.

Gas turbine engines spin a turbine by producing pressurized gas that flows through the turbine. Pressurized gas is produced by burning a fuel such as propane, natural gas, kerosene or jet fuel, which is burned after being injected into a combustor or combustion chamber by a set of fuel nozzles. The connection between the fuel nozzles and the combustor may experience leaks after wear and tear. Thus, the connection may occasionally undergo repair. In addition, the fuel nozzle may be removed for repair, maintenance, or replacement. Unfortunately, the existing connection is not particularly capable of reuse. For example, if the fuel nozzle is removed from the combustor, then the removal may destroy a portion of the fuel nozzle, the combustor, or both. As a result, reconnection of the fuel nozzle to the combustor is particularly problematic.

BRIEF DESCRIPTION OF THE INVENTION

A system, one embodiment, includes an annular seal configured to seal a turbine fuel nozzle to a turbine combustor, wherein the annular seal includes a first annular seal portion having an inner annular surface, a first base portion, and a first peripheral portion opposite from the first base portion. The embodiment also includes the first annular seal portion configured to couple to a second annular seal portion having an outer annular surface, a second base portion, and a second peripheral portion opposite from the second base portion. Further, the embodiment includes the first and second peripheral portions sealable by a weld.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE INVENTION

Figure 1:
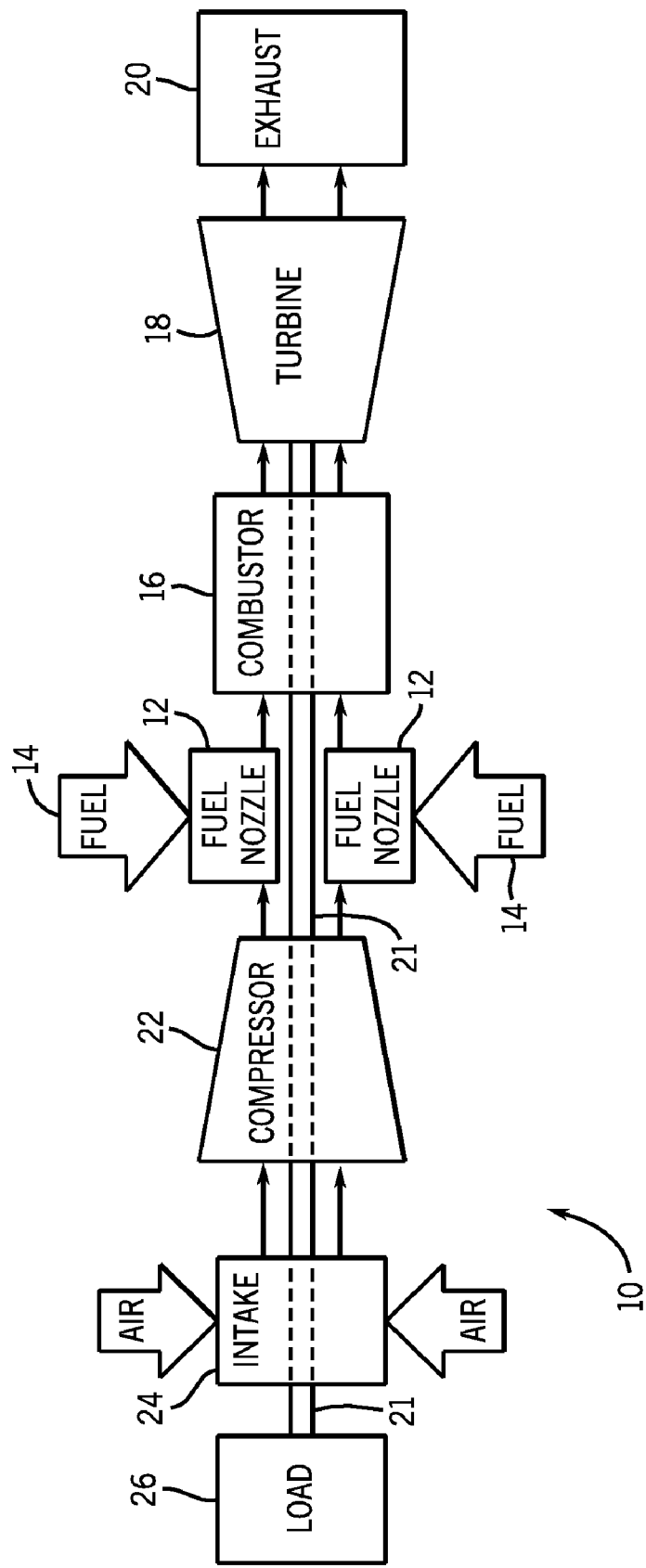
FIG. 1 is a block diagram of a turbine system having fuel nozzles coupled to a combustor with reusable weld joints in accordance with an embodiment of the present technique.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

As discussed in detail below, various embodiments of fuel nozzle and combustor sealing systems may be employed to improve the reliability of a turbine engine. In particular, an embodiment includes first and second annular seal portions that may be welded at peripheral locations to facilitate disconnection and reconnection without destroying the components coupled by the seal portions. For example, the seal portions may include excess material and/or an offset between the weld and the components being sealed together, such that the weld can be easily cut for a simple re-weld over numerous iterations. The annular seal portions may be rings, wherein the first annular seal portion is coupled to, or is a part of, a combustor end cover or base. The second annular seal portion may be coupled to, or a part of, an exterior wall of the fuel nozzle. The peripheral portions of the first and second annular seal portions may be located in a generally transverse direction (e.g., offset) from the surface of combustor end cover. For example, as the nozzle is removed, a weld at the peripheral portions of the annual seal portions is broken. When the weld is broken, material from both annular portions is removed. The designs of the annular portions enable simple replacement of the fuel nozzle and simple re-welding at the peripheral portions of the first and second annular portions. As discussed below, an embodiment of the annular portions is designed to enable re-welding after material has been removed from each annular portion. The design of the annular seal also provides an arrangement for a joint that is able to withstand stress caused by thermal expansion in the fuel nozzle and combustor. As will be discussed further below, the disclosed embodiments enable improved reliability for the weld connection between the fuel nozzle and the combustor end cover. Alternatively, the end cover and fuel nozzle may be joined by a braze or other suitable coupling mechanism. The coupling mechanism of the joint must be sealed so as to prevent leaking of a hydrogen based gas.

Turning now to the drawings and referring first to FIG. 1, a block diagram of an embodiment of turbine system 10 is illustrated. As discussed in detail below, the disclosed embodiments employ a uniquely reusable weld joint between various components in the turbine system 10. Thus, the weld joint can be severed and re-welded without substantial removal of material from the joined components. Turbine system 10 may use liquid or gas fuel, such as natural gas and/or a hydrogen rich syngas, to run the turbine system 10. As depicted, fuel nozzles 12 intake a fuel supply 14, mix the fuel with air, and distribute the air-fuel mixture into a combustor 16. The air-fuel mixture combusts in a chamber within combustor 16, thereby creating hot pressurized exhaust gases. The combustor 16 directs the exhaust gases through a turbine 18 toward an exhaust outlet 20. As the exhaust gases pass through the turbine 18, the gases force turbine blades to rotate a shaft 21 along an axis of system 10. As illustrated, shaft 21 is connected to various components of turbine system 10, including compressor 22. Compressor 22 also includes blades coupled to shaft 21. Thus, blades within compressor 22 rotate as shaft 21 rotates, thereby compressing air from air intake 24 through compressor 22 into fuel nozzles 12 and/or combustor 16. Shaft 21 is also connected to load 26, which may be a vehicle or a stationary load, such as an electrical generator in a power plant or a propeller on an aircraft. Load 26 may be any suitable device that is powered by the rotational output of turbine system 10.

As discussed further below, improvements in the joint between fuel nozzle 12 and combustor 16 provide a reusable connection to facilitate simple replacement, repair, and so forth. The disclosed embodiments reduce the chance of fuel leakage in the connection between the fuel nozzle 12 and combustor 16, while enabling a simple removal and reconnection of the fuel nozzle 12 without damage to fuel nozzle 12 and combustor 16. In other words, the connection can be severed in a manner that enables reuse of the joint over multiple iterations. The severance of the connection does not remove primary structural portions of the joined components, but rather it removes secondary portions that do not reduce the structural integrity of the components.

Figure 2:
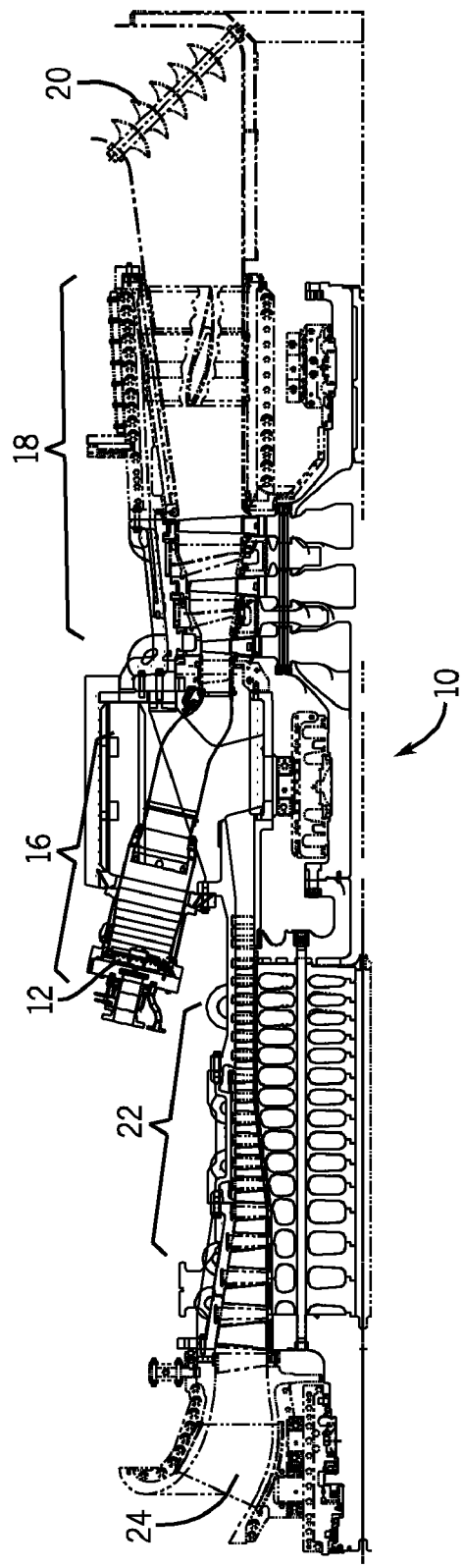
FIG. 2 is a cutaway side view of the turbine system, as shown in FIG. 1, in accordance with an embodiment of the present technique.

FIG. 2 is a cutaway side view of an embodiment of turbine system 10. Turbine system 10 includes one or more fuel nozzles 12 located inside one or more combustors 16, wherein each fuel nozzle 12 is sealed in place via a reusable weld joint in accordance with unique aspects of the disclosed embodiments. In one embodiment, six or more fuel nozzles 12 may be attached to the base of each combustor 16 in an annular or other arrangement. Moreover, the system 10 may include a plurality of combustors 16 (e.g., 4, 6, 8, 12) in an annular arrangement. Air enters the system 10 through air intake 24 and may be pressurized in compressor 22. The compressed air may then be mixed with gas for combustion within combustor 16. For example, fuel nozzles 12 may inject a fuel-air mixture into combustors in a suitable ratio for optimal combustion, emissions, fuel consumption, and power output. The combustion generates hot pressurized exhaust gases, which then drive blades within the turbine 18 to rotate shaft 21 and, thus, compressor 22 and load 26. The rotation of blades cause a rotation of shaft 21, thereby causing blades 19 within compressor 22 to draw in and pressurize air. As appreciated, several sets of components in the system, including sets of combustors 16 and fuel nozzles 12, may be coupled together via the unique reusable weld joint of the disclosed embodiments.

Figure 3:
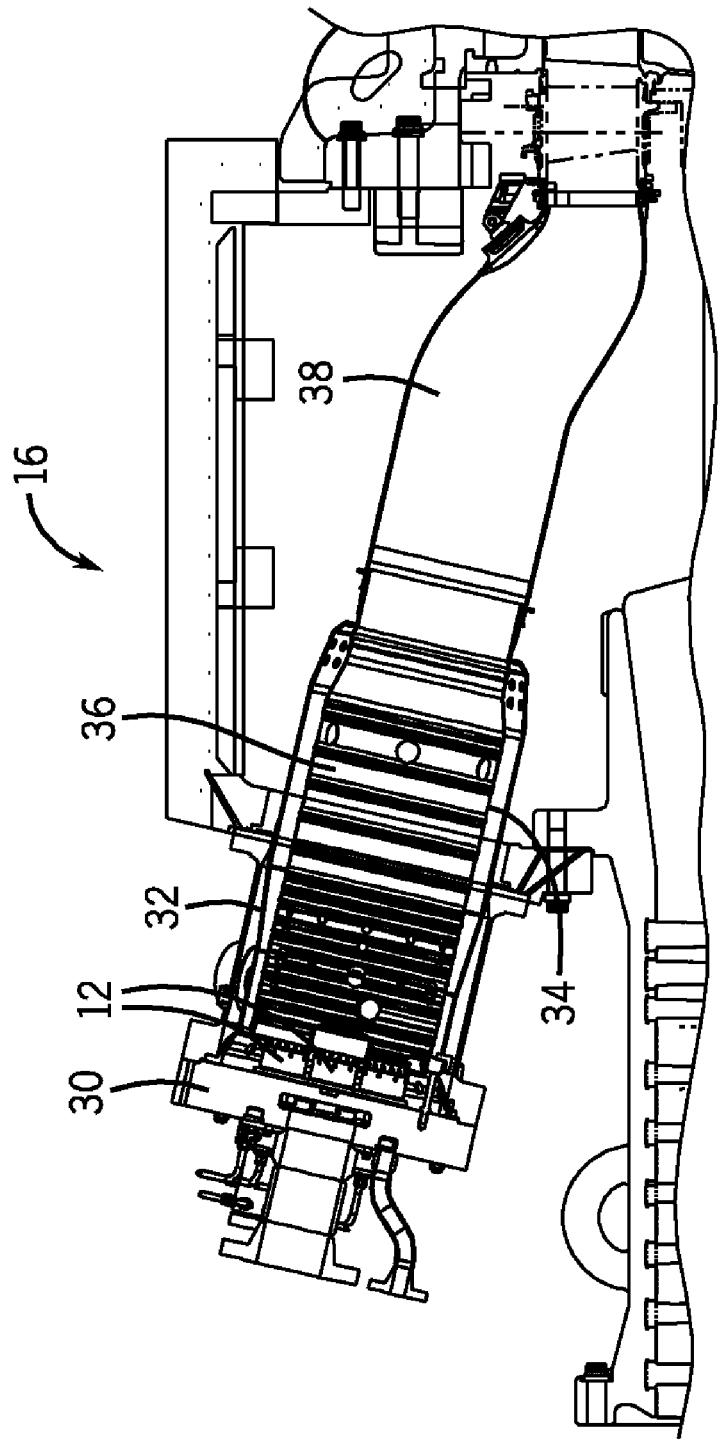
FIG. 3 is a cutaway side view of the combustor, as shown in FIG. 1, with a plurality of fuel nozzles coupled to an end cover with reusable weld joints in accordance with an embodiment of the present technique.

A detailed view of an embodiment of combustor 16, as shown FIG. 2, is illustrated in FIG. 3. In the diagram, a plurality of fuel nozzles 12 are attached to end cover 30, near the base of combustor 16, via a unique reusable weld joint of the disclosed embodiments. In an embodiment, six fuel nozzles 12 are attached to end cover 30. Compressed air and fuel are directed through end cover 30 to each of the fuel nozzles 12, which distribute an air fuel mixture into combustor 16. Combustor 16 includes a chamber generally defined by casing 32, liner 34, and flow sleeve 36. In certain embodiments, flow sleeve 36 and liner 34 are coaxial with one another to define a hollow annular space, which may enable passage of air for cooling and entry into the combustion zone (e.g., via perforations in liner 34). The design of casing 32, liner 34, and flow sleeve 36 provide optimal flow of the air fuel mixture through transition piece 38 (e.g., converging section) towards turbine 18. For example, fuel nozzles 12 may distribute a pressurized air fuel mixture into combustor 16 through liner 34 and flow sleeve 36, wherein combustion of the mixture occurs. The resultant exhaust gas flows through transition piece 38 to turbine 18, causing blades of turbine 18 to rotate, along with shaft 21. The connection between fuel nozzles 12 and end cover 30 may experience stress as pressurized gas fuel and/or air flow through fuel nozzles 12. In particular, the pressurized air may be at a temperature, around 650-900° F., which causes thermal expansion of end cover 30. Fuel may be at around 70-500° F., thereby causing a thermal expansion of nozzle 12 that is of a lesser magnitude, relative to the thermal expansion of end cover 30. Nozzle 12 and end cover 30 may be composed of similar or different materials, such as stainless steel, an alloy, or other suitable material. As a result of differences in materials, temperatures, geometries, and/or thermal expansion characteristics, a joint between the nozzle 12 and end cover 30 may experience considerable stresses. As discussed in detail below, an embodiment of the joint between nozzle 12 and end cover 30 provides a secure seal and stress relief during thermal expansion in the joint. A sealed joint between fuel nozzle 12 and end cover 30 generally prevents leakage of a hydrogen rich fuel into combustor 16, thereby eliminating unwanted flame allocation or autoignition.

Figure 4:
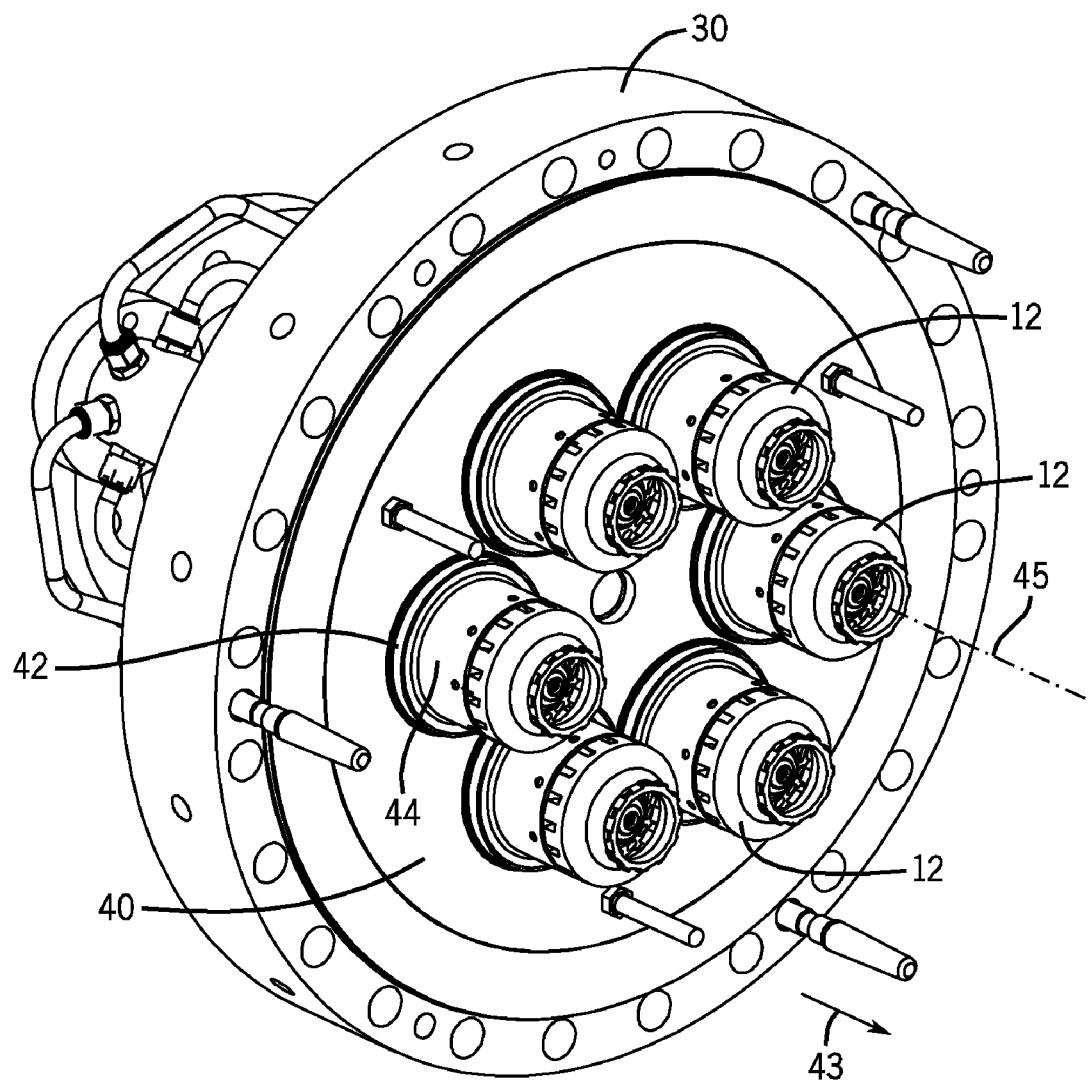
FIG. 4 is a perspective view of the end cover and fuel nozzles of the combustor, as shown in FIG. 3, in accordance with certain embodiments of the present technique.

FIG. 4 is a detailed perspective view of an embodiment of end cover 30 with a plurality of fuel nozzles 12 attached at a surface 40 via unique reusable joints 42. In the illustration, six fuel nozzles 12 are attached to end cover base surface 40 in an annular arrangement via reusable joints 42. However, any suitable number and arrangement of fuel nozzles 12 may be attached to end cover base surface 40 via the unique reusable joint, e.g., weld joint or annular sealing joint 42. In an embodiment, annular sealing joint 42 may include a first annular portion attached to end cover base surface 40 and a second annular portion attached to exterior nozzle surface 44. Annular sealing joint 42 is an arrangement that enables a sealing weld between fuel nozzle 12 and end cover base surface 40 to be located in a peripheral direction 43, at an offset away from end cover base surface 40. For example, a weld, such as an electron beam weld, may join the two annular portions of annular sealing joint 42 at an offset in the peripheral direction 43, along axis 45, away from, and generally peripheral to, end cover base surface 40. For example, a weld located in peripheral direction 43 may be broken in order to remove fuel nozzle 12 for repair or replacement. Nozzle 12 may need repair due to wear and tear, such as crack formations on exterior nozzle surface 44. In such a case, the nozzle 12 may need to be removed by breaking sealing joint 42. After a replacement or repair, fuel nozzle 12 may be placed along annular sealing joint 42 and re-welded, thereby providing a structurally strong sealing joint for fuel nozzle 12. Further, in some instances, fuel nozzle 12 may be removed and replaced 1, 2, 3, 4, 5, or more times with the illustrated configuration of annular sealing joint 42. In other words, the design of sealing joint 42 enables material to be removed multiple times for multiple iterations of removal and re-attachment of fuel nozzle 12, while still enabling a secure weld to re-attach nozzle 12 upon replacement without destroying the structural integrity of the base surface 40 and/or fuel nozzle 12. In certain embodiments, a life cycle of end cover 30 is approximately the same as a multiplier (e.g., five times) a life cycle of a fuel nozzle 12 until replacement. In other words, the present design allows for a structurally solid welded sealing joint 42 that will match a typical life cycle of end cover 30.

Figure 5:
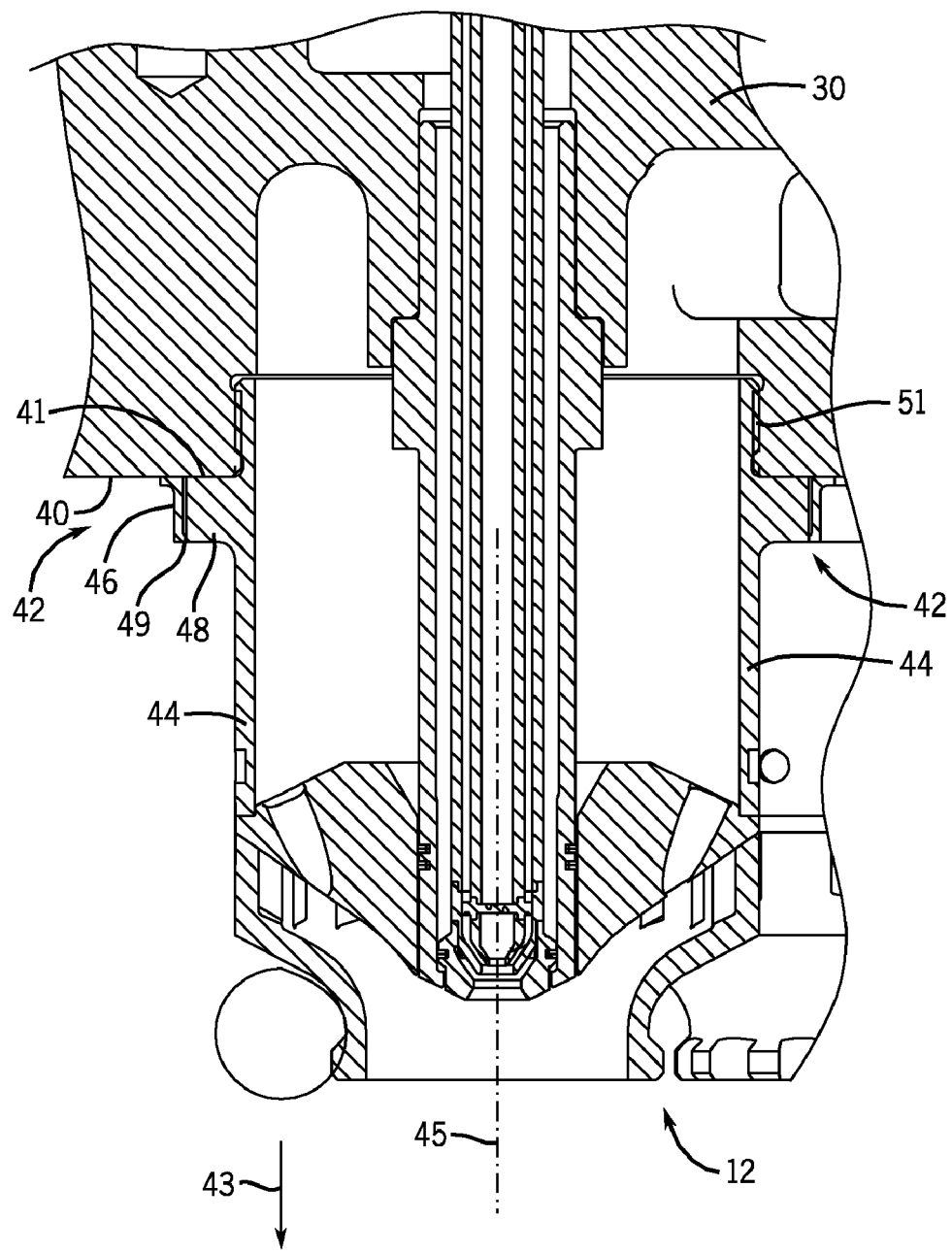
FIG. 5 is a cutaway side view of a portion of the end cover with a fuel nozzle, as shown in FIG. 4, with a reusable weld joint in accordance with an embodiment of the present technique.

FIG. 5 is an illustration of a cutaway side view of an embodiment of fuel nozzle 12. In the illustrated embodiment, annular sealing joint 42 includes outer annular seal portion 46 and inner annular seal portion 48. Seal portion 46 has a cross-section in the shape of an L. Seal portion 46 may be attached to end cover base surface 40 via a weld or may be an integral part of end cover base surface 40 via a casting, machining, or other suitable process. Seal portion 46 protrudes outwardly from surface 40 in the axial direction 43 along axis 45. Seal portion 48 also protrudes outwardly from a surface 44 of fuel nozzle 12 in a radial direction, thereby defining an annular flange having a diameter greater than surface 44. Thus, seal portions 46 and 48 protrude in crosswise directions, away from surfaces 40 and 44 toward one another. This arrangement enables the joint 42 to be reused. The location of joint 42 in peripheral direction, radial to surface 44, allows the joint to be severed without damaging or affecting the performance of nozzle 12. In the illustrated embodiment, seal portion 48 has a cross-section in the form of a rectangle or a solid cross-section that is a radial protrusion from exterior nozzle surface 44 that abuts a portion 41 of surface 40. In certain embodiments, seal portion 48 may be an integral part of nozzle 12 (e.g., surface 44) or seal portion 48 may be a ring or other component that may be attached to exterior nozzle surface 44 via a weld, braze or other suitable attachment process. In an embodiment, nozzle 12, annular seal portions 46 and 48, and end cover 30 may be composed of a stainless steel alloy.

As depicted, a weld 49 between outer annular seal portion 46 and inner annular seal portion 48 may provide structural reinforcement and a seal between fuel nozzle 12 and end cover base surface 40. Weld 49 may be of any suitable type for the temperatures and conditions involved. For example, an electron beam weld 49 may withstand extreme temperatures and provide a seal between the nozzle 12 and end cover 30 components. As previously discussed, pressurized air and fuel may flow through fuel nozzle 12 in a downstream direction 43 toward the combustion region. Weld 49 secures fuel nozzle 12 to end cover base surface 40, preventing leakage of fuel within combustor 16. The protruding geometry of portions 46 and 48 position weld 49 at an offset from both surfaces 40 and 44, thereby enabling a simple severance and re-welding over multiple iterations as discussed further below.

In certain embodiments, weld 49 may be used alone or in combination with one or more other fastening mechanisms between fuel nozzle 12 and base 30. In the illustrated embodiment, threads 51 may be used to secure fuel nozzle 12 into end cover base 30. Threads 51 secure nozzle 12 from moving downstream, in direction 43. In alternative embodiments, weld 49 may be the only coupling or attachment between fuel nozzle 12 and end cover 30. For instance, without threads 51 of nozzle 12 and end cover 30, weld 49 may provide structural support by securing nozzle 12 along axis 45, thereby preventing forces in direction 43 from dislodging nozzle 12. Moreover, with or without threads 51 removed, sealing joint 42 and nozzle base surface 40 provides a structure to properly locate nozzle 12 along axis 45 as nozzle 12 is mounted to end cover 30, providing a seal between the components.

Figure 6:
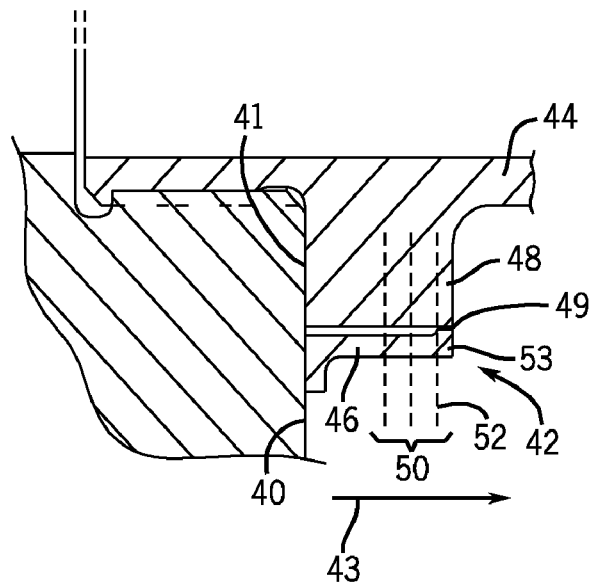
FIG. 6 is a detailed cutaway side view of the reusable weld joint, as shown in FIG. 5, in accordance with an embodiment of the present technique.

FIG. 6 is a detailed cutaway side view of an embodiment of annular sealing joint 42. As shown, inner annular seal portion 48 includes a rectangular cross-section that may be joined by weld 49 to outer annular seal portion 46. The cross-section of outer annular seal portion 46 may be described as L shaped. In the illustrated embodiment, material may be removed from outer annular seal portion 46 and inner annular seal portion 48 to enable removal of fuel nozzle 12 from end cover 30 by machining or other cutting techniques. Lines 50 illustrate multiple iterations of material removal from outer annular seal portion 46 and inner annular seal portion 48 to break multiple iterations of weld 49 for removal of fuel nozzle 12. For instance, weld 49 may be broken by removing material from the right of line 52 on each of the annular seal portions 46 and 48. After fuel nozzle 12 has been replaced onto end cover base surface 40, a new weld may be located along line 52 between outer annular seal portion 46 and inner annular seal portion 48, thereby providing structural support and a seal to prevent leakage of fuel into the combustor 16.

In an embodiment, outer annular seal portion 46 may contain a lip portion that protrudes slightly toward inner annular seal portion 48, which is depicted by numeral 53. Lip portion 53 provides a structure to locate weld 49 between the two annular portions 46 and 48. As illustrated, material from annular seal portions 46 and 48 may be removed several times, as indicated by the two additional lines 50 to the left of line 52. Each of these lines 50 illustrate a location for an iteration of material removal to break a weld 49, and also resealing with a new weld 49. Annular portions 46 and 48 may be sized for any desired number of weld breaks and re-welds. The illustrated embodiment shows only three lines, yet it may be sized for a much greater number of weld breaks and re-welds. For example, joint 42 may size seal portions 46 and 48 for five or more nozzle repairs before annular sealing joint 42 is no longer reusable. As previously discussed, the duration of five or more nozzle repairs may be selected to span the expected life of end cover 30, matching the components of annular sealing joint 42 to the life expectancy of the surrounding combustor 16 components. Arrow 43 points in a peripheral and axial direction, which is the direction, relative to end cover 30, where weld 49 may be located in annular sealing joint 42.

Figure 7:
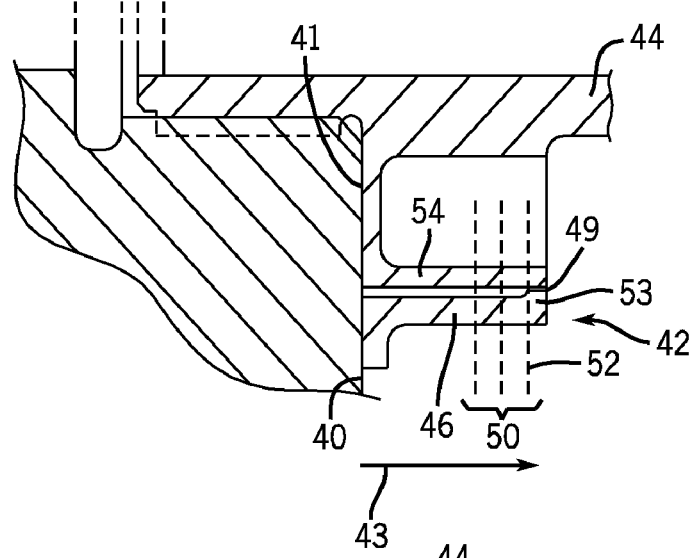
FIG. 7 is a detailed cutaway side view of the reusable weld joint, in accordance with an another embodiment of the present technique.

FIG. 7 is a detailed cutaway side illustration of an alternative embodiment of annular sealing joint 42. Annular sealing joint 42 includes annular seal portion 46 with an L-shaped cross-section, and annular seal portion 54 with a U-shaped cross-section. In the illustrated configuration, annular seal portions 46 and 54 are joined by weld 49. As appreciated, inner annular seal portion 54 may be an integral radial protrusion from exterior nozzle surface 44 or may be a separate ring component coupled to exterior nozzle surface 44 by welding, brazing, or other suitable fasteners. Further, outer annular seal portion 46 may be an integral axial protrusion from end cover base surface 40 or may be coupled to base surface 40 via a weld, braze, or other suitable fasteners. As previously discussed, material from annular seal portions 46 and 54 may be removed via a machining process in order to break weld 49, enabling removal of fuel nozzle 12 from end cover 30. Lines 50 illustrate the portions of material that may be removed from annular seal portions 46 and 54 over multiple iterations of removal and re-attachment of fuel nozzle 12 with end cover 30. Arrow 43 points in a peripheral and axial direction, which is the direction, relative to end cover 30, where weld 49 may be located. In an embodiment, annular seal portions 46 and 54 may include a pair of thinner annular walls, which make it easier to remove material to detach nozzle 12.

Figure 8:
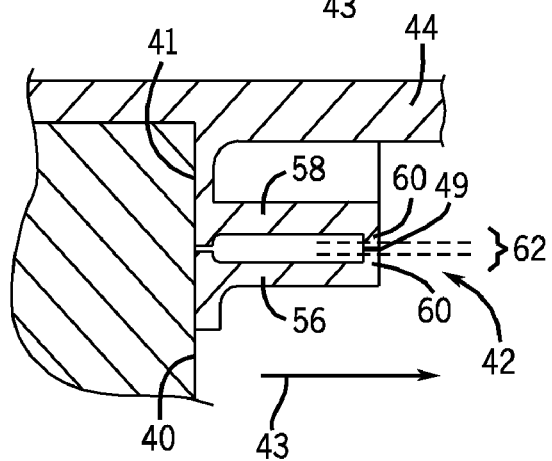
FIG. 8 is a detailed cutaway side view of the reusable weld joint, in accordance with another embodiment of the present technique.

FIG. 8 is a detailed cutaway side view of another embodiment of annular sealing joint 42 simile to joint 42 of FIG. 9. However, in the illustrated embodiment, joint includes outer and inner annular seal portions 56 and 58 with facing lip portions 60. Similar to the embodiment of FIG. 7, the seal portions 56 and 58 have L-shaped and U-shaped cross-sections, respectively. The lip portions 60 may facilitate formation of weld 49 between the fuel nozzle 12 and end cover 30. As indicated by line 62, material from annular seal portions 56 and 58 may be removed to break weld 49, thereby enabling the removal of fuel nozzle 12. After removal of material shown by line 62, fuel nozzle 12 may be replaced and annular seal portion 56 and 58 may be re-welded, wherein the space vacated by the removed material may be filled by a weld material. Arrow 43 points in a peripheral and axial direction, which is the direction, relative to end cover 30, where weld 49 may be located. As depicted, the weld 49 is severed in a direction parallel to axis 45, whereas the embodiments of FIGS. 6 and 7 enable a weld perpendicular to axis 45.

As appreciated, the configuration of annular seal portions within annular sealing joint 42 may be of various shapes, such as rectangles or trapezoids, which are designed to allow weld 49 to be broken and rejoined, to enable repair and replacement of fuel nozzle 12. Further, the design of annular seal portions within annular sealing joint 42 will enable a re-welding between the components that provides structural relief and a leak proof seal between fuel nozzle 12 and end cover 30. Joint 42 adds material to both components being sealed, such that the material of the components being joined is not impacted by iterations of removal. The joint 42 generally positions weld 49 at a peripheral position to the nozzle 12 and end cover 30. The peripheral position is axially offset from surface 40 and radially offset from surface 44. However, the offsets may be in the same direction, e.g. both axial or both radial in other embodiments.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A system, comprising:
a turbine combustor;
a fuel nozzle; and
an annular seal, comprising:
a first annular seal portion protruding from a base of the turbine combustor, wherein an inner circumference of the first annular seal portion has a first cylindrical surface that is perpendicular to the base;
a second annular seal portion protruding from an exterior of the fuel nozzle, wherein an outer circumference of the second annular seal portion has a second cylindrical surface that extends a distance along the first cylindrical surface in a common direction away from the base to peripheral portions of the respective first and second annular seal portions; and
a weld between the first and second annular seal portions, wherein the weld is located at the peripheral portions of the first and second annular seal portions, away from the base.

2. The system of claim 1, wherein the first annular seal portion comprises an L-shaped cross-section and the second annular seal portion comprises a U-shaped cross-section.

3. The system of claim 1, wherein the first annular seal portion comprises an L-shaped cross-section and the second annular seal portion comprises a rectangular cross-section.

4. The system of claim 1, wherein the first and second annular seal portions comprise opposite lips extending toward one another at the peripheral portions, and the weld secures the opposite lips to one another.

5. The system of claim 1, comprising a plurality of fuel nozzles, including the fuel nozzle, coupled to the base of the turbine combustor, wherein each of the fuel nozzles comprises a respective one of the first or second annular seal portions.

6. The system of claim 1, wherein the first and second annular seal portions are configured to enable multiple iterations of material removal to enable multiple weld severances and re-welds without removing material from the fuel nozzle and turbine combustor.

7. The system of claim 1, wherein the common direction is generally parallel to an axis of the fuel nozzle.

8. A system, comprising:
an annular seal configured to seal a turbine fuel nozzle to a turbine combustor, wherein the annular seal comprises:
a first annular seal portion having an inner annular surface, a first base portion, and a first peripheral portion opposite from the first base portion;
wherein the first annular seal portion is configured to couple to a second annular seal portion having an outer annular surface, a second base portion, and a second peripheral portion opposite from the second base portion;
wherein the first base portion is configured to be coupled to the turbine combustor and the second base portion is configured to be coupled to the fuel nozzle;
wherein the inner and outer annular surfaces extend a distance along one another in a common direction to the first and second peripheral portions; and
wherein the first and second peripheral portions are sealable by a weld.

9. The system of claim 8, wherein the first and second annular seal portions are configured to enable multiple iterations of material removal to enable multiple weld severances and re-welds without removing material from the fuel nozzle and turbine combustor.

10. The system of claim 8, wherein the first annular seal portion comprises an L-shaped cross-section.

11. The system of claim 8, wherein the first annular seal portion is coupled to the turbine combustor and the inner annular surface is generally perpendicular to a surface of the turbine combustor and is generally parallel to the outer annular surface.

12. The system of claim 8, wherein the first and second annular seal portions are axially separable from one another while coupled to the fuel nozzle and turbine combustor within the weld.

13. The system of claim 8, wherein the first and second annular seal portions do not overlap in an axial direction relative to one another.

14. The system of claim 8, wherein the first base portion is coupled to the turbine combustor, the second base portion is coupled to the fuel nozzle, and the first and second peripheral portions are offset from a surface of the turbine combustor and an exterior surface of the fuel nozzle.

15. The system of claim 8, wherein the first annular seal portion comprises an L-shaped cross-section and the second annular seal portion comprises a U-shaped cross-section.

16. The system of claim 8, wherein the common direction is generally parallel to an axis of the turbine fuel nozzle.

17. A system, comprising: a first annular seal portion comprising
an inner circumference, wherein the first annular seal portion protrudes in a generally perpendicular direction away from a base of a turbine combustor;
a second annular seal portion comprising an outer circumference generally parallel to and extending a distance along the inner circumference in a common direction away from the base, wherein the second annular seal portion protrudes away from an exterior of a fuel nozzle; and
a weld between the first and second annular seal portions configured to seal a the fuel nozzle to the turbine combustor, wherein the weld is located at peripheral portions of the first and second annular seal portions away from the base and the exterior.

18. The system of claim 17, wherein the first annular seal portion comprises an L-shaped cross-section and the second annular seal portion comprises a rectangular shaped cross-section.

19. The system of claim 17, wherein the first annular seal portion comprises an L-shaped cross-section and the second annular seal portion comprises a U-shaped cross-section or another L-shaped cross-section.

20. The system of claim 17, wherein the first and second annular seal portions are configured to enable multiple iterations of material removal to enable multiple weld severances and re-welds without removing material from the fuel nozzle and turbine combustor.

21. The system of claim 17, wherein the first and second annular seal portions do not overlap in an axial direction relative to one another.

22. The system of claim 17, wherein a surface of the second annular circumference is generally parallel to an exterior surface of the turbine fuel nozzle and is generally parallel to a surface of the first annular circumference.

23. The system of claim 17, wherein the common direction is generally parallel to an axis of the fuel nozzle.

* * * * *